(No Model.)

N. NILSON.
VEHICLE SPRING.

No. 262,973.          Patented Aug. 22, 1882.

WITNESSES:
Walter S. Dodge,
N. C. Huntemann

INVENTOR:
Nils Nilson,
by Dodge Son,
Attys.

UNITED STATES PATENT OFFICE.

NILS NILSON, OF MAPLE PLAIN, MINNESOTA.

VEHICLE-SPRING.

SPECIFICATION forming part of Letters Patent No. 262,973, dated August 22, 1882.

Application filed March 20, 1882. (No model.)

*To all whom it may concern:*

Be it known that I, NILS NILSON, of Maple Plain, in the county of Hennepin and State of Minnesota, have invented certain Improvements in Vehicle-Springs, of which the following is a specification.

My invention consists in a spring for vehicles, formed of a flat metal strip having a square or polygonal eye at one end, about which the strip is coiled in a spiral or volute form, the opposite end of the spring being provided with an eye or otherwise adapted for attachment to the vehicle.

Figure 1:
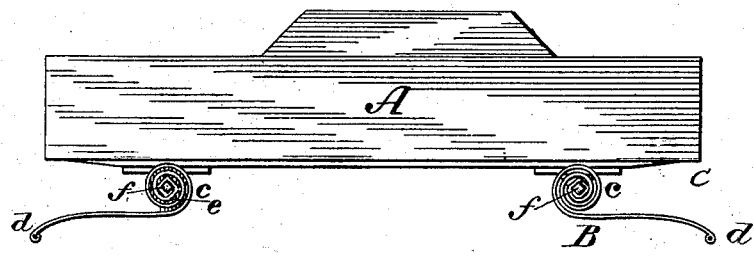
Figure 2:
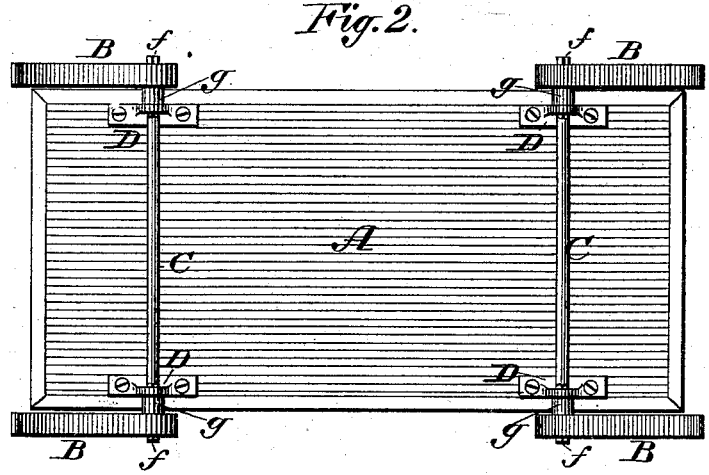

In the accompanying drawings, Figure 1 represents a side elevation of a wagon-body provided with my improved springs; Fig. 2, a bottom face view of the same, and Fig. 3 an enlarged perspective view of the spring detached.

The purpose of my invention is to produce a spring possessing a high degree of elasticity and strength, and yet cheap in construction; and to this end it consists in forming the spring as represented in the drawings, in which—

Figure 3:
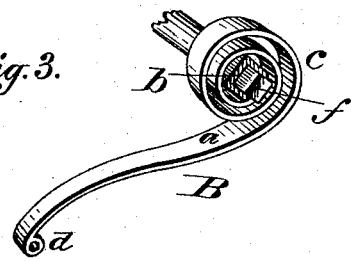

A represents a wagon body or box, and B the springs upon which said body is hung or supported. As shown in Fig. 3, each spring consists of a flat metal strip, $a$, which in practice is fine spring-steel, provided at one end with a square or polygonal eye, $b$, about which the spring is coiled to form the spiral or volute $c$, between the folds of which sufficient space is left to permit the spring to bend and move in every part when in action. At the other end the spring is carried outward, forming a leaf or arm, $c'$, and is furnished with a second eye, $d$, or is otherwise formed to permit its ready attachment to the running-gear or other part of the vehicle. If greater stiffness be desired, a strip, $e$, of rubber, cut to the width of the spring, may be introduced into the space between the coils or folds of the spiral.

The springs thus formed are applied to square or polygonal stems or shanks $f$, which may be formed separately upon irons or fittings specially made for the purpose; or, as is preferred, they may be formed upon the ends of spring-bars C, extending from one spring to another, as shown in Fig. 2, the spring-bars themselves being firmly held against turning by means of clips or fittings D, by which they are secured to the body.

In order that the springs may not chafe the sides of the wagon-body, short tubular necks or washers $g$ are placed upon the shanks or stems $f$, between the blocks or clips D and the springs, thus properly spacing the springs and throwing them slightly beyond the sides of the body.

The springs, when arranged as here represented, will be attached to the rear axle by stirrups or links, and in a similar manner to the front bolster or head at the forward end of the body; but when used in connection with side bars will be placed at right angles to the position shown.

It is apparent that a key may be used to secure the springs to the shanks or stems $f$, in which case the eyes $b$ may be of circular form, though this plan is not considered so desirable as the formation of the polygonal eyes.

The rubber strip $e$ may be held in place by cement, by its own elasticity, or by any suitable fastening.

I am aware that a compound spring for vehicles has been patented, in the construction of which spirally-coiled or scroll springs were employed; but under the construction described and claimed in said patent, and as stated therein, it is necessary to employ two springs united by a coupling-bar and shackle-jointed links to form one operative device; hence there was no simple scroll-spring capable of being used as such.

I am also aware that india-rubber has been introduced between the leaves of an elliptical carriage-spring to reduce the effects of friction, and this I do not claim.

The rubber as applied in my spring gives additional stiffness, and is used for that purpose.

Having thus described my invention, what I claim is—

1. As a new article of manufacture, a spring for vehicles, consisting of the flat metal strip, coiled as explained, provided with a leaf or arm, and with a polygonal eye within the coil, as shown, whereby it is adapted to be used without other attachments in vehicles.

2. In combination with the spring, coiled as shown and described, the rubber strip e, applied as and for the purpose set forth.

3. The combination, with the rigid spring-bar C, having squared ends f, and the tubular washers g, of the spirally-coiled springs B, the innermost coil of each of which is squared to fit upon the squared end of the bar C, as set forth.

4. A spring for vehicles, having a central eye, about which the spring is coiled in spiral form, the outer coil being extended from the under side of the spring outward, whereby it is adapted to be attached directly to an axle or side bar, as explained.

NILS NILSON.

Witnesses:
WILLIAM W. DODGE,
WALTER S. DODGE.